United States Patent [19]

Naden

[11] Patent Number: 4,891,512
[45] Date of Patent: Jan. 2, 1990

[54] THERMO-OPTIC DIFFERENTIAL EXPANSION FIBER SENSOR

[75] Inventor: James M. Naden, Dartford, Great Britain

[73] Assignee: STC PLC, London, England

[21] Appl. No.: 313,378

[22] Filed: Feb. 21, 1989

[30] Foreign Application Priority Data

Feb. 20, 1988 [GB] United Kingdom ................. 8803997

[51] Int. Cl.⁴ ............................................... H01J 5/16
[52] U.S. Cl. ................................ 250/227; 250/231 R; 250/231 P
[58] Field of Search ............... 250/231 R, 231 P, 227; 73/862.59, 862.41

[56] References Cited

U.S. PATENT DOCUMENTS

| | | | |
|---|---|---|---|
| 4,294,513 | 10/1981 | Nelson | 350/96.29 |
| 4,713,540 | 12/1987 | Gilby et al. | 73/862.59 |
| 4,772,786 | 9/1988 | Langdon | 250/231 R |

FOREIGN PATENT DOCUMENTS

| | | |
|---|---|---|
| 54-131980 | 10/1979 | Japan. |
| 54103270 | 3/1981 | Japan. |
| WO86/05271 | 9/1986 | PCT Int'l Appl.. |
| 2125572 | 3/1984 | United Kingdom. |
| 2126820 | 3/1984 | United Kingdom. |
| 2136113 | 9/1984 | United Kingdom. |

OTHER PUBLICATIONS

Patent Abstracts of Japan, vol. 3, No. 153 (E-159), 15th Dec. 1979, p. E 159.
Patent Abstracts of Japan, vol. 5, No. 81 (P-63), 753, 27th May 1981.
EP Search Report, Application No. 89 301 530.5.
M. Johnson and R. Ulrich, "Fibre-Optical Relay", Applied Physics Letters, vol. 31, No. 10, Nov. 15, 1977, pp. 675-676.
U.K. Search Report, Application 8803997.

*Primary Examiner*—David C. Nelms
*Assistant Examiner*—Khaled Shami
*Attorney, Agent, or Firm*—Lee, Mann, Smith, McWilliams & Sweeney

[57] ABSTRACT

An optically addressed optical fiber sensor system in which light is employed to excite an optical fiber cantilever (6) into mechanical oscillation at a frequency $f_o$. This oscillation modulates the amplitude of the light launched into the cantilever. The sensed parameter controls the displacement of the free end of the cantilever with respect to the end of the fiber (2) from which light is launched into the cantilever. The magnitude of this displacement affects the magnitudes of the components of modulated light at frequencies $f_o$ and $2f_o$. From an analysis of these components a measure of the displacement is obtained, and also a measure of the magnitude of the sensed parameter.

3 Claims, 3 Drawing Sheets

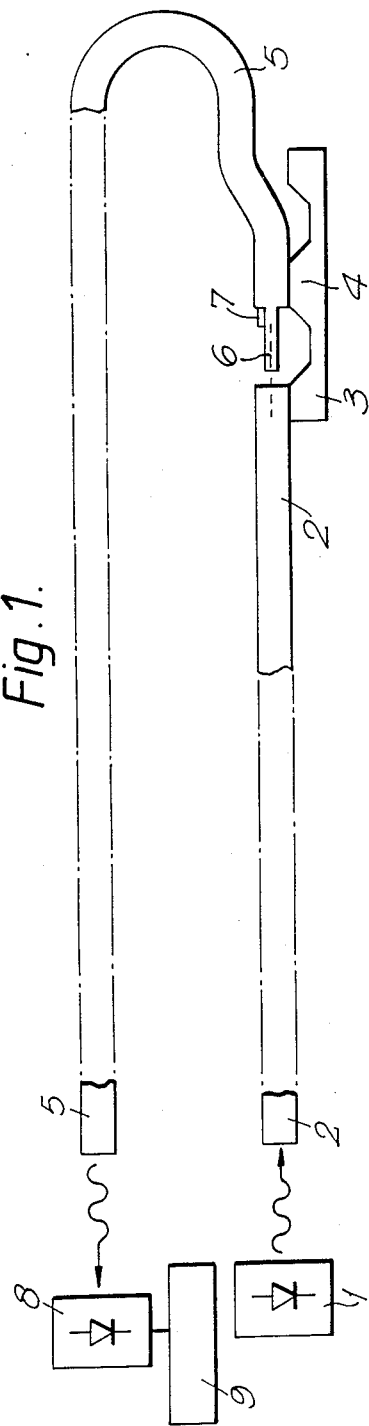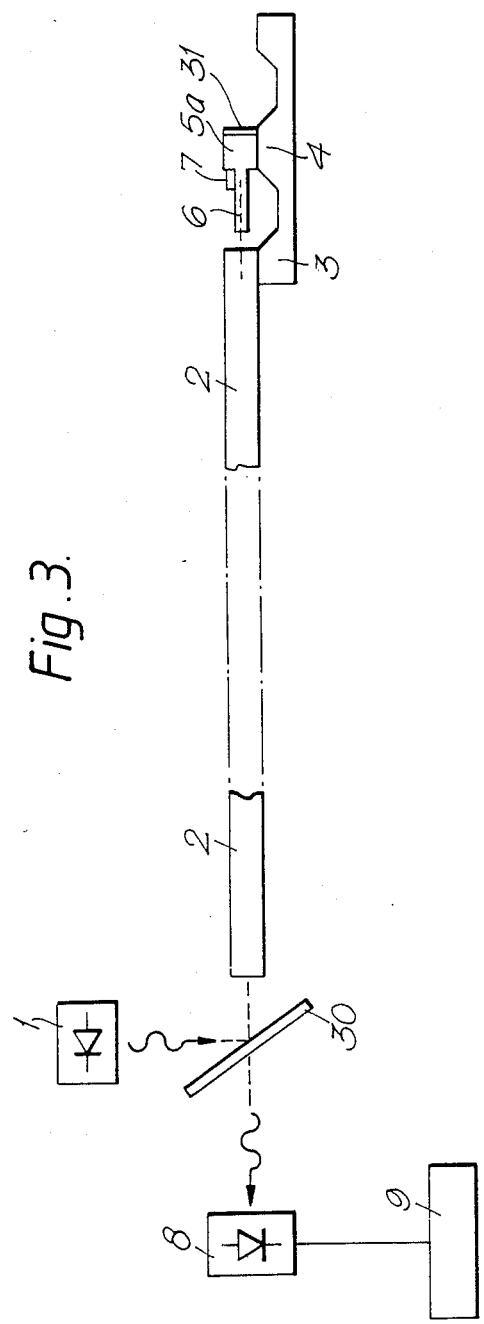

THERMO-OPTIC DIFFERENTIAL EXPANSION FIBER SENSOR

BACKGROUND OF THE INVENTION

This invention relates to an optically addressed optical waveguide sensor system in which a change in the magnitude of the sensed parameter effects a displacement of a component within the sensor system. Examples of such sensors include for instance strain sensors in which the strain is transmitted directly to the sensor system, and pressure sensors in which the pressure effects displacement of a region of some for of diaphragm.

The invention finds particular application in situations requiring remote monitoring of a parameter sensed in some form of hostile environment where it is inadvisable, impractical or inconvenient to employ electrical transducers.

A paper, to which attention is directed, entitled 'Fiber-optical relay' by M. Johnson and R. Ulrich, appearing in Applied Physics Letters Volume 31, No. 10 (Nov. 15, 1977), pages 675–6, describes how a steady beam of light ducted down a first optical fibre may be used to excite into mechanical oscillation a short length of a second optical fibre mounted as a cantilever. For this purpose a metallic pad is located close to the fibre core on one side of the second fibre near the root of the cantilever where it will absorb light being guided by that fibre. This absorption produces local heating, and the phenomenon of differential thermal expansion is employed to produce a consequent bending of the fibre. As a result of this bending, the optical coupling efficiency between the two fibres is reduced, and so the heating of the metallic pad is also reduced, with the result that the bending of the fibre is reduced, and thereby the fibre is excited into oscillation by the incident light. The authors of that paper explain that the resonant properties of the device can be exploited for absorption or deposition monitoring. Material absorbed by or deposited upon the cantilever can be expected to provide a loading which will effect its natural frequency of mechanical oscillation. They also explain how the quality factor of the oscillation is affected by the ambient pressure, and suggest that the resonant properties of the device are capable of being exploited for pressure sensing. Another factor mentioned by the authors as a parameter liable to affect this frequency is the thermal expansion of the material of the cantilever, though it is suggested that by an appropriate choice of material this dependence should be capable of being eliminated.

SUMMARY OF THE INVENTION

An object of the present invention is to provide a sensor of more general application in which the sensed parameter either is linear displacement or acts upon a transducer which provides changes in linear displacement in response to changes in magnitude of the sensed parameter. A further object of the invention is to provide a remote sensing sensor in which the parameter being sensed is sensed at a first location and a measure of its magnitude is transmitted to the second location for utilisation. The second location typically, though not necessarily, includes some form of display. More particularly it is an object of the invention to provide a remote sensing sensor which does not require the transmission of electrical power or electrical signals between the two locations.

In pursuance of these objects, a feature of the present invention is the use of an optical waveguide which is optically excited into mechanical vibration. A measure of the magnitude of the sensed parameter is however not determined from a measurement of the quality factor of that vibration, nor is it determined solely from a measure of the fundamental frequency of that vibration, but instead is determined from a measure of the harmonic content of that vibration.

According to the present invention there is provided an optically addressed optical waveguide sensor system in which a change in the magnitude of the sensed parameter effects a change in the differential absorption of light guided by a vibrating optical waveguide, and in which means are provided for analysing the components of the guided light at the fundamental frequency of vibration and at an harmonic of this frequency to determine the sensed parameter.

The invention also provides an optically addressed optical waveguide sensor system in which a change in the magnitude of the sensed parameter effects a displacement of the mounting of an optical waveguide cantilever in a direction at right angles to the equilibrium axis of the cantilever and in the plane of bending of the cantilever that results from differential absorption of light guided by it, wherein light is directed into the free end of the cantilever from the adjacent end of a second optical waveguide and from the cantilever to a photodetector, and means are provided for analysing the components of the detected signal at the fundamental frequency of light-induced oscillation of the cantilever and at twice this frequency to determine the magnitude of the mean displacement of the free end of the cantilever with respect to the adjacent end of the second optical waveguide.

BRIEF DESCRIPTION OF THE DRAWINGS

There follows a description of two pressure sensors embodying the invention in preferred forms. The description refers to the accompanying drawings in which:

FIG. 1 is a diagram of a transmissive type sensor

FIG. 3 is a diagram of a reflective type sensor, and

DETAILED DESCRIPTION OF THE PREFERRED EMBODIMENTS

Figure 2:
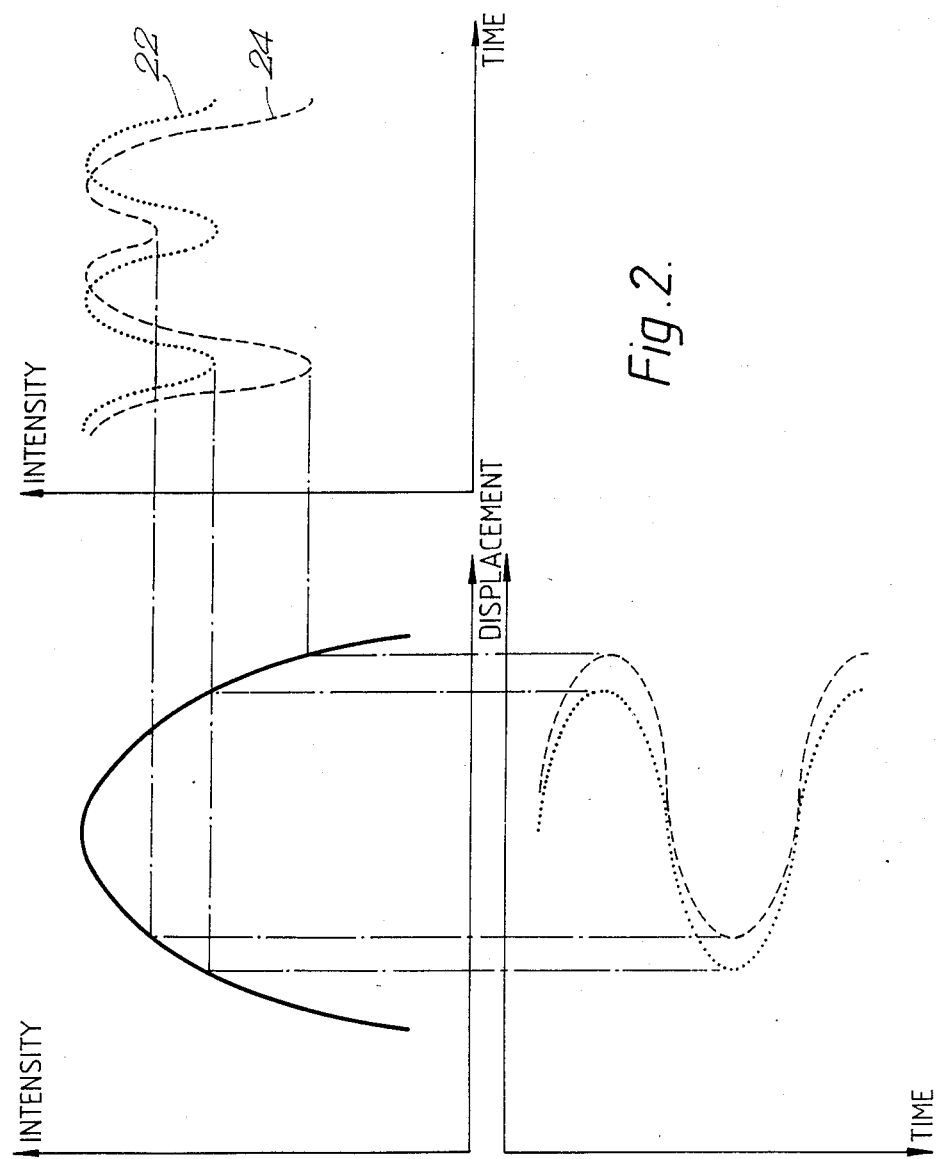
FIG. 2 is a diagram illustrating the operation of the sensor of FIG. 1

Both the pressure sensors now to be described have two distinct portions remote from one another but linked by optical fibre. One, a transducer portion, contains the transducer which is responsive to the sensed parameter, in this instance pressure. The other, an interrogate and read out portion, contains an optical source for powering the transducer, a photodetector for measuring the return signal and spectrum analysis equipment for extracting the requisite information from the detected signal.

The pressure sensor of FIG. 1 is a transmissive type sensor in which a light source 1 in the interrogate and read out portion of the sensor, typically a laser diode, is employed to launch light down a first optical fibre 2, typically a single mode fibre, to the transducer portion of the sensor system. The far end of this fibre is mounted in fixed relationship to the rim of a diaphragm 3. To the central region 4 of this diaphragm, which may be made out of single crystal silicon, is attached one of a second optical fibre 5 near one of its ends. Overhanging the point of attachment is a cantilever portion 6 of the fibre 5, this cantilever portion terminating slightly spaced from, but otherwise in optical registry with, the end of fibre 2. Typically this cantilever is about 1mm long. On one side of the cantilever, near its root, is located an optically absorbing coating 7 which is designed to absorb some of the light launched into the cantilever from fibre 2. The cantilever has therefore been thinned in order that the coating shall be located in a position close enough to the axis to absorb a sufficient portion of the propagating light. The objective of absorbing this light is to produce localised asymmetric heating which will cause the cantilever to bend by virtue of differential thermal expansion. The location of the coating 7 is arranged to produce bending of the cantilever in a plane containing the normal to the diaphragm. Light that has been launched into the cantilever, and that is not absorbed by the coating 7, is transmitted by fibre 5 from the transducer portion of the sensor system back to the interrogate and read out portion where it is detected by a photodetector 8. The output of this photodetector is fed to a spectrum analyser 9.

A small proportion of the light from source 1 that is coupled from fibre 2 into the cantilever 6 is absorbed by the coating 7, causing it to heat up and the fibre to bend. If, before this bending occurs, the free end to the cantilever is positioned for optimum optical coupling, the result of the bending will be to reduce the optical coupling, which in turn leads into a reduction in the heating of the coating 7 and hence a reduction in the bending. As the cantilever straightens, its coating 7 once again begins to absorb more light, and the cycle is repeated. In this way the steady light from the source 1 is employed to excite the cantilever into flexural vibration at its natural frequency.

Refering now to FIG. 2, curve 20 is a plot showing how the coupling efficiency of light from fibre 2 into the end of the cantilever 6 varies as a function of displacement of its free end in a direction at right angles to the axis of fibre 2. (This curve 20 also plots the intensity of the light coupled from fibre 2 into the cantilever). Curve 21 is a plot of the displacement of the free end of the cantilever as a function of time when the cantilever is excited into flexural oscillation from a rest position in which it is optimally coupled with fibre 2. Hence from curves 20 and 21 it can be seen that the resulting intensity of light launched into the cantilever and on through fibre 5 to detector 8 varies as a function of time as depicted by curve 22. If however the diaphragm 3 is subjected to a pressure causing it to bow and displace the cantilever a certain distance away from a rest position that is optimally coupled with fibre 2 then the mechanical oscillation may be described by curve 23 in which case the light received at the detector 8 will vary according to the function described by curve 24. Assuming that curves 21 and 23 are both sinusoids of frequency $f_o$, and that the coupling efficiency function plot 20 is symmetrical, it will be observed that principal difference between curves 22 and 24 is that, whereas both curves have components at a frequency $2f_o$, only curve 24 has a component at a frequency $f_o$. Therefore by analysis of the components at frequencies of $f_o$ and $2f_o$ in the output of the photodetector 8 it is possible to derive a measure of the magnitude of the displacement of the mean position of the free end of cantilever 6 from the optimum optical coupling position. The effects of temperature upon the length and stiffness of the cantilever will mean that the resonant frequency $f_o$ will vary as a function of temperature and this may also affect the amplitude of the mechanical oscillation. The value of $f_o$ may thus be used to indicate the temperature of the sensor.

The pressure sensor of FIG. 1 is a transmissive type sensor that employs two fibres to link the transducer portion of the sensor with the interrogate and read out portion. FIG. 3 shows how the sensor arrangement of FIG. 1 may be modified to form a reflective type sensor that enables the use of only a single fibre to link these two portions. In the sensor of FIG. 3 light from source 1 is directed into the end of fibre 2 via a beam splitter 30. (In the drawing this is represented as a partial reflector though in practice it may be preferred to employ an optical fibre 3dB coupler for this function). The cantilever is formed by a stub length of fibre 5a whose other end terminates in a total reflector 31 so that light launched into the cantilever that is not absorbed by the coating 7 is reflected back along the cantilever. From here the light is launched back into fibre 2 with a coupling efficiency determined by the instantaneous position of the free end of the cantilever with respect to the fibre 2. At the other end of fibre 2 part of the returning light is directed by beam splitter 30 on to photodetector 8 whose output is fed to spectrum analyser 9. As an alternative to affixing fibre 5a, complete with cantilever 6, absorber 7 and reflector 31, to the surface of the central region 4 of the diaphragm 3, these components can be formed on the surface of the diaphragm using integrated optics manufacturing techniques followed by undercutting of the cantilever to give it freedom of movement.

Figure 4:
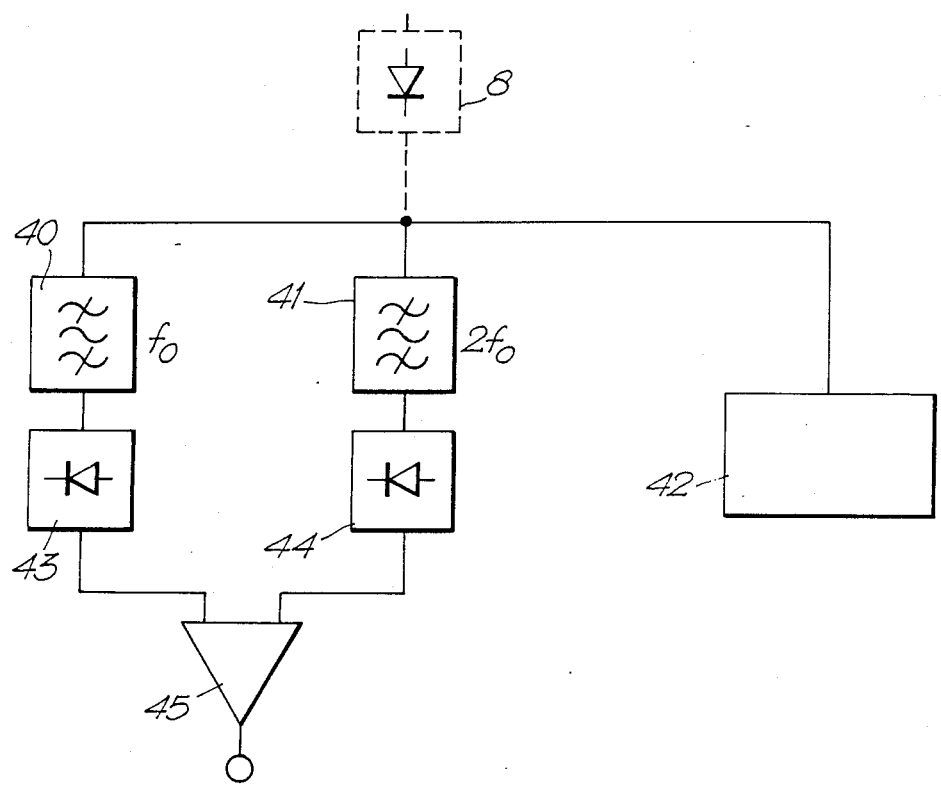
FIG. 4 is a circuit diagram of an implementation of the spectrum analyser of the sensor of FIGS. 1 and 3

The spectrum analyser 9 of FIGS. 1 and 3 may comprise a fairly basic type of instrument as schematically depicted in FIG. 4 in which the output of the detector 8 feeds two pass-band filters 40 and 41 respectively tuned to frequency bands in the neighbourhood of $f_o$ and $2f_o$, and also to a phaselocked loop frequency detector 42. The outputs of the two filters are fed to respective rectifying and smoothing circuits 43 and 44 whose outputs are connected to the two inputs of a differential amplifier 45.

The output from differential amplifier 45 provides a measure of the displacement of the central portion 4 of diaphragm 3. The output from the frequency detector 42 provides a measure of the temperature of the cantilever and hence of the diaphragm. This output can be employed in the conversion of the displacement measurement into a pressure measurement to compensate for temperature dependent systematic error arising from temperature dependence of the resilience of the diaphragm.

I claim:

1. An optically addressed optical waveguide sensor system in which a change in the magnitude of the sensed parameter effects a displacement of the mounting of an optical waveguide cantilever in a direction at right angles to the equilibrium axis of the cantilever and in the place of bending of the cantilever that results from differential absorption of light guided by it, wherein light is directed into the free end of the cantilever from the adjacent end of a second optical waveguide and from the cantilever to a photodetector, and means are provided for analysing the components of the detected signal at the fundamental frequency of light-induced oscillation of the cantilever and at twice this frequency to determine the magnitude of the mean displacement of the free end of the cantilever with respect to the adjacent end of the second optical waveguide.

2. A sensor as claimed in claim 1 which sensor is a pressure sensor in which the cantilever is mounted on a diaphram and in which the means for analysing the components of the detected signal includes means for measuring the value of the fundamental frequency of light induced oscillation and employing this value to compensate systematic error in the pressure measurement occasioned by temperature induced change in diaphragm resilience.

3. An optically addressed optical waveguide sensor system in which an optical signal is employed to excite an optical waveguide cantilever into flexural oscillation, and in which a change in magnitude of a sensed parameter effects a displacement of the equilibrium axis of the cantilever with respect to a second optical waveguide that over at least part of a flexural oscillation cycle of the cantilever is optically coupled with the cantilever, wherein means are provided for comparing the amplitudes of the fundamental frequency component of said optical coupling and a harmonic thereof, from which comparison is derived a measure of said displacement.

* * * * *